United States Patent [19]

Kumura et al.

[11] Patent Number: 5,139,121
[45] Date of Patent: Aug. 18, 1992

[54] BRAKING SYSTEM FOR A VEHICLE HAVING A PROPELLING ELECTRIC MOTOR AND AN ELECTROMAGNETIC BRAKE

[75] Inventors: Shigenori Kumura; Jiro Kuramoto; Gonshiro Kawabata, all of Sakai, Japan

[73] Assignee: Kubota Corporation, Osaka, Japan

[21] Appl. No.: 793,625

[22] Filed: Nov. 18, 1991

[30] Foreign Application Priority Data

Nov. 20, 1990 [JP] Japan .................. 2-317081

[51] Int. Cl.⁵ .......................................... B60K 41/20
[52] U.S. Cl. ........................... 192/1.43; 192/1.25; 192/1.37; 192/1.55; 180/65.1; 318/371
[58] Field of Search ............... 192/1.43, 1.25, 1.37, 192/1.39, 1.55; 180/65.1, 216, 907; 318/364, 371

[56] References Cited

U.S. PATENT DOCUMENTS

| | | | |
|---|---|---|---|
| 2,586,273 | 2/1952 | Steven | 192/1.55 X |
| 3,621,929 | 11/1971 | Oberthur | 192/1.43 X |
| 4,415,049 | 11/1983 | Wereb | 180/6.5 |
| 4,641,720 | 2/1987 | Young | 180/216 X |
| 4,962,969 | 10/1990 | Davis | 318/371 X |

Primary Examiner—Richard Lorence
Assistant Examiner—Andrea Pitts
Attorney, Agent, or Firm—Webb, Burden, Ziesenheim & Webb

[57] ABSTRACT

A braking system for a vehicle having a propelling electric motor and an electromagnetic brake, includes a friction brake; a manually operable brake control lever; an interlocking device for transmitting a displacement of the brake control lever to operate the friction brake; a detecting device for detecting the displacement of the brake control lever and outputting a displacement detection signal; and a control device connected to the electric motor, the electromagnetic brake and the detecting device for controlling the electric motor and the electromagnetic brake and receiving the displacement detection signal from the detecting device. The control device is a board computer operable to reduce rotating rate of the electric motor and actuate the electromagnetic brake to exert a braking force below a maximum braking force during a predetermined period following receipt of the displacement detection signal, and upon lapse of the predetermined period to stop the electric motor and actuate the electromagnetic brake to exert the maximum braking force. When the brake control lever is operated to stop the running vehicle, the running speed is gradually lowered over the predetermined time following an operation of the brake control lever. Consequently, shocks due to stopping of the vehicle are suppressed. The electric motor receives no power supply and the brake is set to a maximum braking state after lapse of the predetermined time. The vehicle is positively stopped by a combined effect of elimination of the propelling drive and the maximum braking force.

5 Claims, 5 Drawing Sheets

BRAKING SYSTEM FOR A VEHICLE HAVING A PROPELLING ELECTRIC MOTOR AND AN ELECTROMAGNETIC BRAKE

BACKGROUND OF THE INVENTION

1. Field of the Invention

The present invention relates to a small electric vehicle having a propelling electric motor and an electromagnetic brake for use by an aged or physically handicapped person.

2. Description of the Related Art

This type of electric vehicle may have a friction type brake operable by a force transmitted from a control lever, a propelling electric motor stopped in response to an operation of the control lever, and an electromagnetic brake operable in response to the operation of the control lever. Thus, the vehicle is braked reliable even when only a weak operating force is applied to the control lever by an aged or other driver.

Such an electric vehicle is intended to be an aid for walking, and runs substantially at walking speed. A strong braking force is not necessarily optimal, but what is required is a sufficient braking force for safety's sake with gentle braking characteristics to avoid braking shocks. Conventional braking systems assure a braking force strong enough for safety but not sufficient from the viewpoint of characteristics based on a gentle consideration for humans.

SUMMARY OF THE INVENTION

The object of the present invention is to provide a braking system for an electric motor vehicle having a manually operable brake and an electromagnetic brake, which provides a strong braking force and braking characteristics gentle to humans without entailing braking shocks.

The above object is fulfilled, according to the present invention, by a braking system in which the control device is operable to reduce rotating rate of the electric motor and actuate the electromagnetic brake to exert a braking force below a maximum braking force during a predetermined period following receipt of the displacement detection signal, and upon lapse of the predetermined period to stop the electric motor and actuate the electromagnetic brake to exert the maximum braking force.

With this braking system, when the brake control lever is operated to stop the running vehicle, the running speed is gradually lowered over the predetermined time following an operation of the brake control lever. Consequently, shocks due to stopping of the vehicle are suppressed. The electric motor receives no power supply and the brake is set to a maximum braking state after lapse of the predetermined time. The vehicle is positively stopped by a combined effect of elimination of the propelling drive and the maximum braking force.

A safe drive is possible for an aged driver or the like since the vehicle is stopped reliably while suppressing shocks due to a braking operation. After the vehicle has stopped, the electric motor receives no power supply. Therefore, when the driver alights from the vehicle and pushes the vehicle, for example, there is no possibility of a danger caused by inadvertent generation of a propelling force.

Other features and advantages of the present invention will be apparent from the description of the preferred embodiments to be had with reference to the drawings.

DETAILED DESCRIPTION OF THE PREFERRED EMBODIMENTS

Embodiments of the present invention will be described hereinafter with reference to the drawings.

Figure 1:
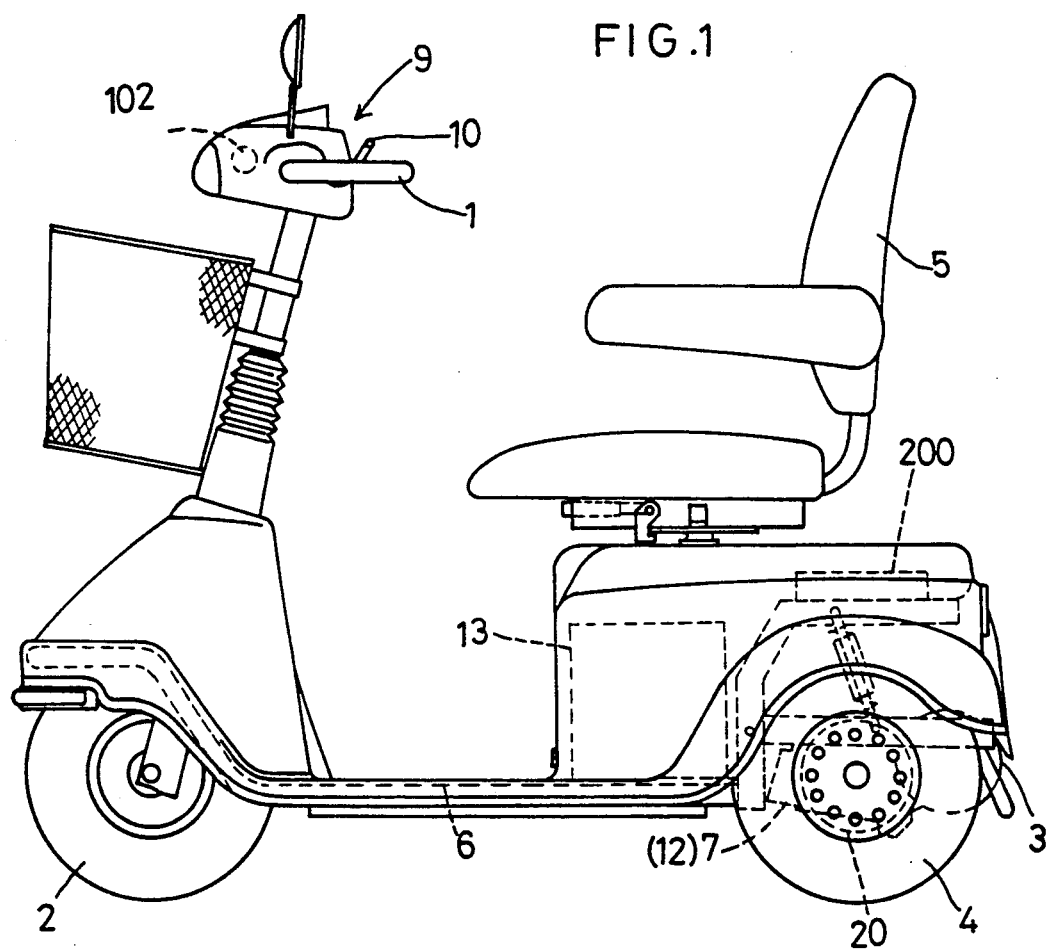
FIG. 1 is a side elevation of a small electric vehicle employing a braking system according to the present invention.
Figure 2:
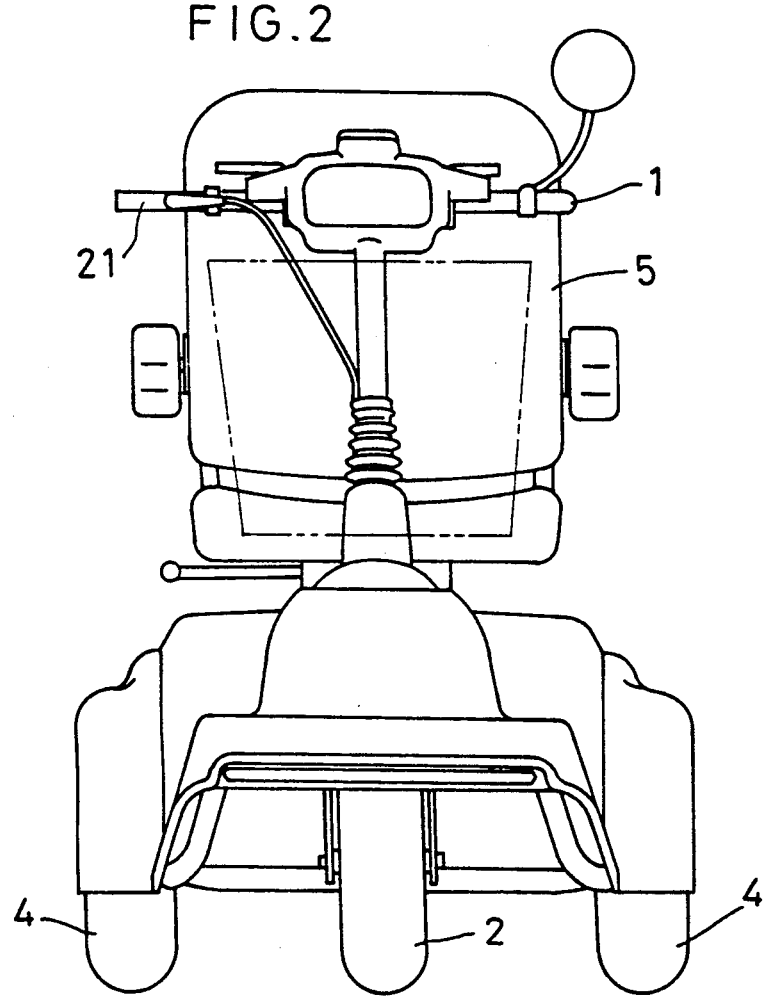
FIG. 2 is a front elevation of the small electric vehicle.
Figure 3:
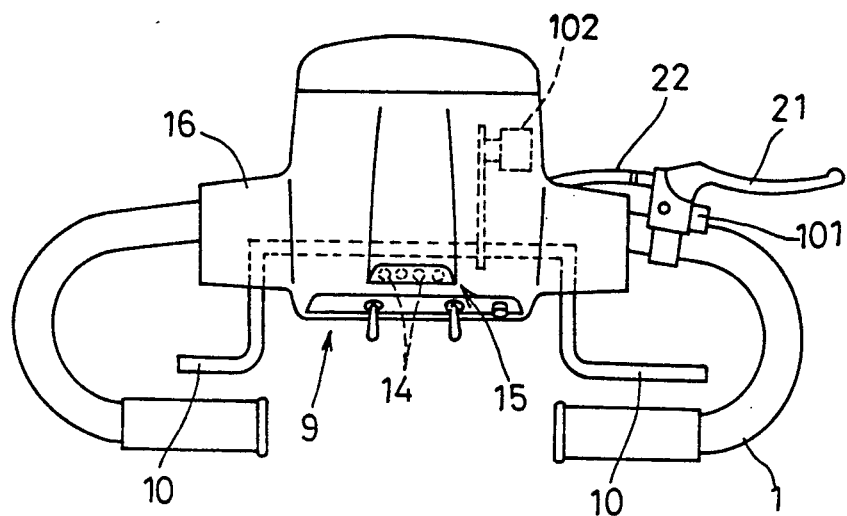
FIG. 3 is a plan view of a steering section.

FIGS. 1 and 2 show a small electric vehicle according to the present invention. This electric vehicle has a steering handle 1 for steering a front wheel 2, an electric motor 3 for driving right and left rear wheels 4, and a driver's seat 5 disposed above the rear wheels 4. These components are supported by a vehicle frame 6. Drive of the electric motor 3 is transmitted to the rear wheels 4 through a transmission 7. The electric motor 3 is controlled by a control device 200 mounted underneath the driver's seat 5. As also shown in FIG. 3, the steering handle 1 is attached to a steering column 9 including an accelerator lever 10 mounted in an upper position of the steering column 9 for gripping with the steering handle 1. The accelerator lever 10 has a potentiometer 102 for converting a displacement of the accelerator lever 10 to an electric signal for output to the control device 200. The control device 200 controls the electric motor 3 to provide a running speed corresponding to the signal from the potentiometer 102 or the displacement of the accelerator lever 10. The electric motor 3 acts as a heavy rotational load when power is not supplied thereto.

Figure 4:
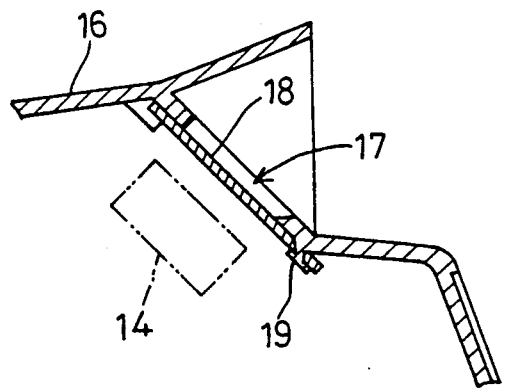
FIG. 4 is a fragmentary side view of a residual capacity indicator.
Figure 5:
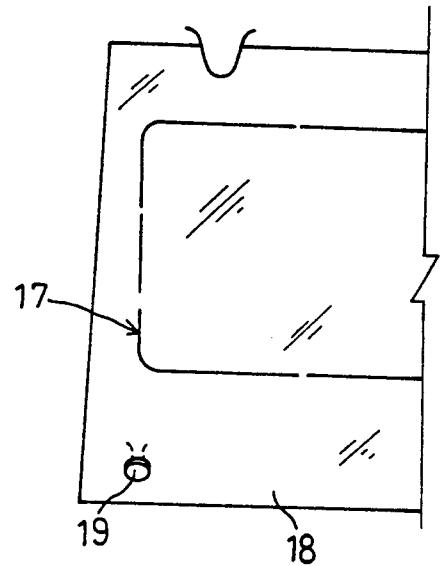
FIG. 5 is a rear view of the residual capacity indicator.

A battery 13 is mounted under the driver's seat 5, and the steering column 9 has a residual capacity indicator 14 including a plurality of light emitting diodes for displaying a residual capacity of the battery 13. As shown in FIGS. 4 and 5, the indicator 14 is mounted in a panel case 16 defining a window 17 having a translucent plastic plate 18 attached to the window 17 from inside to facilitate observation of the light emitting diodes. The plastic plate is fitted to projections 19 formed on the panel case 16, and fixed in place by caulking the projections 19.

The transmission 7 contains an electromagnetic brake 12. This brake 12 includes a solenoid energized to move spring-loaded brake shoes out of frictional contact with brake drums. When de-energized, the solenoid allows the brake shoes to be pressed on the brake drum under the spring load. A manually operable friction brake 20 is provided adjacent the rear wheels 4 to be operable through a control lever 21.

Figure 6:
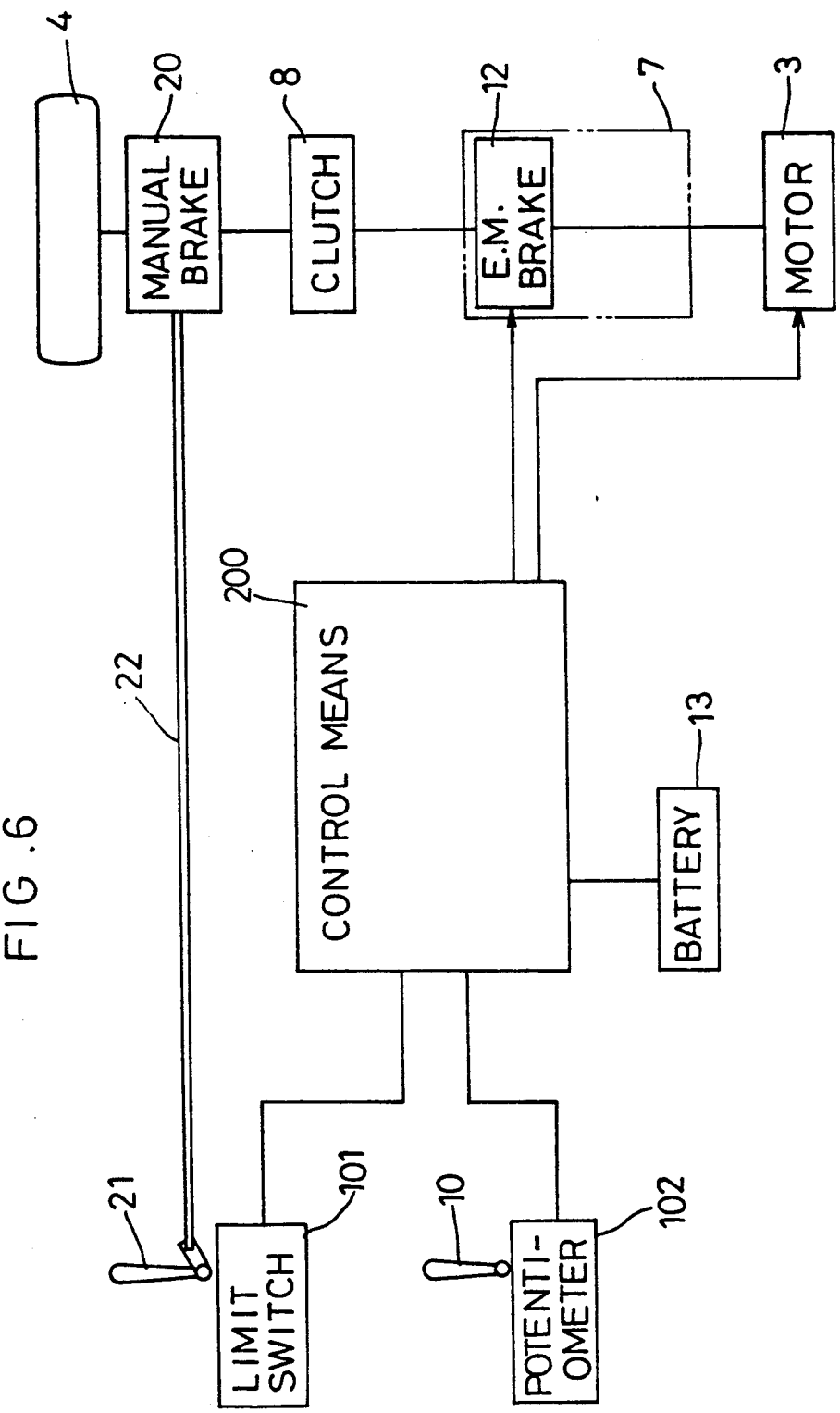
FIG. 6 is a block diagram of the braking system according to the present invention.

The control lever 21 is disposed adjacent the steering handle 1 for gripping with the handle 1 by the driver. A displacement of this control lever 21 is transmitted to the friction brake 20 through an interlocking cable 22. Thus, the vehicle is braked by a braking force corresponding to the displacement of the control lever 21. A limit switch 101 is disposed adjacent the control lever 21 to act as a device for detecting operation of the lever 21. In response to detecting action of the limit switch 101, the control device 200 stops the electric motor 3 and actuates the electromagnetic brake 12. FIG. 6 shows a block diagram of a braking system according to the present invention, in which the control device 200 acts as a central component. The control device 200 receives signals from the limit switch 101 and potentiometer 102, and outputs control signals to the electromagnetic brake 12 and motor 3. This system receives power from the battery 13. As seen from FIG. 6, a manually operable clutch 8 is mounted between the electromagnetic brake 12 and rear wheels 4 in a propelling transmission system for transmitting drive from the motor 3 to the rear wheels 4.

The braking system is operable to reduce rotating rate of the electric motor 3 and at the same time actuate the electromagnetic brake 12 to exert a braking force below a maximum force in order to gradually decrease running speed during a period from a point of time of detection by the limit switch 101 to elapse of a predetermined time thereafter. Upon elapse of the predetermined time, the braking system stops power supply to the electric motor 3 and actuates the electromagnetic brake 12 to exert the maximum braking force.

Figure 7:
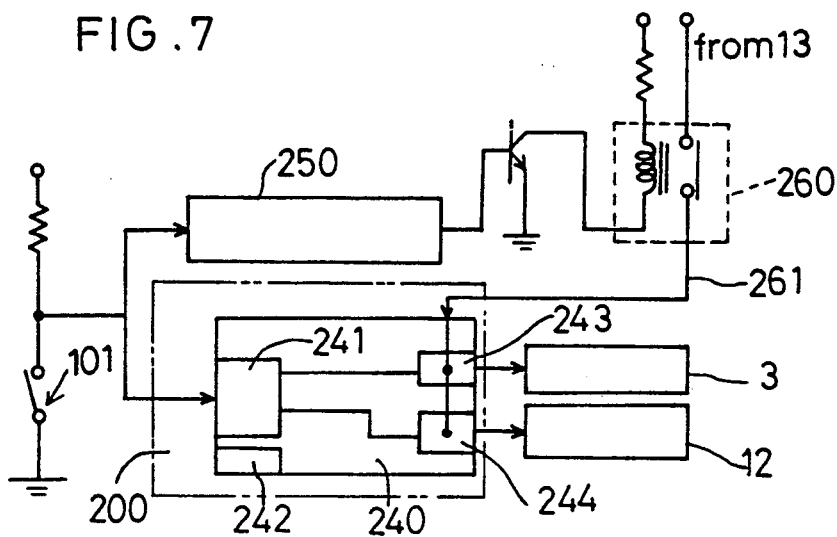
FIG. 7 is a block diagram of a control unit included in the control system.
Figure 8:
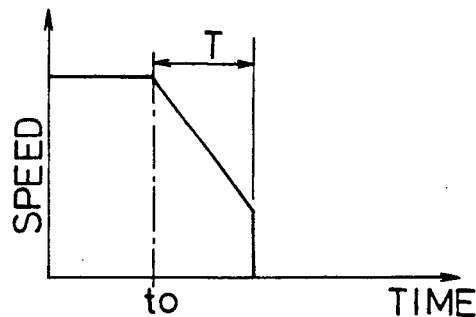
FIG. 8 is a view showing braking characteristics of the braking system.

The control device having the above functions may be implemented in various forms. FIG. 7 shows a block diagram of one example, in which the output signal of the limit switch 101 is applied to the control device 200 and a delayed drive circuit 250. The control device 200 includes a control unit 241 as a central component thereof. When the limit switch 101 detects an operation of the control lever 21, i.e. when the limit switch 101 is turned on, the control unit 241 operates according to a first control sequence programmed to the control device 200, to generate control signals for transmission to a brake driver 243 and a motor driver 244 for gradually reducing the rotating rate of the electric motor 3 and gradually increasing the braking force of the electromagnetic brake 12 in order to reduce the running speed from the point of time of detection by the limit switch 101. The delayed drive circuit 250 turns off an electromagnetic relay 260 mounted on a power supply line 261 connected to the control device 200 upon lapse of the predetermined time: T after the point of time: t0 of detection as shown in FIG. 8. As a result, power supply to the control device 200, and thus to the two drivers 243 and 244, is cut off, whereby drive current to the electric motor 3 becomes zero, and so does the energizing current to the electromagnetic brake 12 to set the electromagnetic brake 12 to a maximum braking state.

Figure 9:
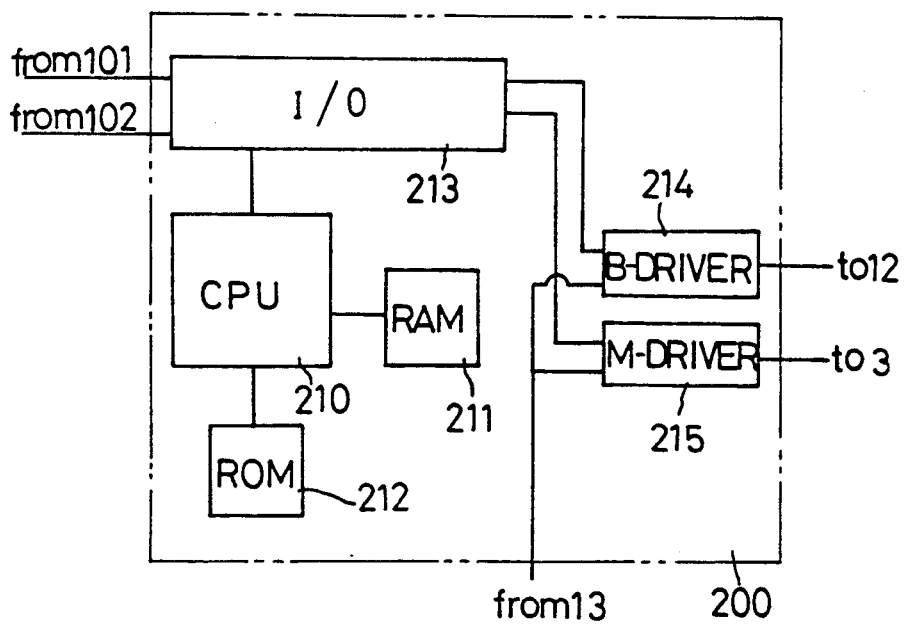
FIG. 9 is a block diagram of a modified control unit.

FIG. 9 shows a block diagram of a modified control device 200 comprising a board computer which is itself known. The signals from the limit switch 101 and potentiometer 102 are received through an I/O interface 213 and temporarily stored in a RAM 211. The control device 200 includes a ROM 212 for storing a program for gradually reducing rotating rate of the electric motor 3, a program for actuating the electromagnetic brake 12 below the maximum braking force, a program for stopping the electric motor 3 and a program for actuating the electromagnetic brake 12 for the maximum braking force upon lapse of the predetermined time after input of the displacement detection signal, as well as a main control program. A CPU 210 generates control signals based on these programs for transmission to a brake driver 214 and a motor driver 215. The CPU 210 has an internal counter for measuring the predetermined time for the point of time of detection by the limit switch 101.

With the braking system according to the present invention, as described above, the vehicle is gradually slowed down over the predetermined time following an operation of the brake control lever 21. Consequently, shocks due to sudden stopping of the vehicle are avoided. Since the electric motor 3 receives no power supply after lapse of the predetermined time, the vehicle will not start inadvertently, thereby assuring safety.

What is claimed is:

1. A braking system for a vehicle having a propelling electric motor and an electromagnetic brake, comprising:
    a friction brake;
    a manually operable brake control lever;
    interlocking means for transmitting a displacement of said brake control lever to operate said friction brake;
    detecting means for detecting the displacement of said brake control lever and outputting a displacement detection signal; and
    control means connected to said electric motor, said electromagnetic brake and said detecting means for controlling said electric motor and said electromagnetic brake and receiving said displacement detection signal from said detecting means;
    wherein said control means is operable to reduce rotating rate of said electric motor and actuate said electromagnetic brake to exert a braking force below a maximum braking force during a predetermined period following receipt of said displacement detection signal, and upon lapse of the predetermined period to stop said electric motor and actuate said electromagnetic brake to exert the maximum braking force.

2. A braking system as claimed in claim 1, wherein said electric motor acts as a heavy rotational load when power supply thereto is cut off, and said electromagnetic brake has the braking force suppressed by an electromagnetic force and acts as a negative brake to exert the maximum braking force when power supply thereto is cut off, said control means being operable to cut off the power supply to said electric motor and said electromagnetic brake upon lapse of said predetermined period.

3. A braking system as claimed in claim 2, further comprising a delayed drive circuit for receiving said displacement detection signal, wherein said electric motor and said electromagnetic brake receive the power supply through said control means, said delayed drive circuit being operable to cut off the power supply to said control means upon lapse of said predetermined period after receipt of said displacement detection signal.

4. A braking system as claimed in claim 1, wherein said control means comprises a microcomputer for storing a program for gradually reducing the rotating rate of said electric motor, and a program for actuating said electromagnetic brake below the maximum braking force, which are started upon input of said displacement detection signal, as well as a program for stopping said electric motor and a program for actuating said electromagnetic brake for the maximum braking force, which are started upon lapse of said predetermined period after input of the displacement detection signal.

5. In a braking system for a vehicle having a propelling electric motor and an electromagnetic brake, said braking system having:
- a friction brake;
- a manually operable brake control lever;
- interlocking means for transmitting a displacement of said brake control lever to operate said friction brake;
- detecting means for detecting the displacement of said brake control lever and outputting a displacement detection signal; and
- control means connected to said electric motor, said electromagnetic brake and said detecting means for controlling said electric motor and said electromagnetic brake and receiving said displacement detection signal from said detecting means;

a method of controlling said control system, comprising the steps of:
starting time measurement after receipt of said displacement detection signal, and at the same time reducing rotating rate of said electric motor and actuating said electromagnetic brake to exert a braking force below a maximum braking force; and
stopping said electric motor and actuating said electromagnetic brake to exert the maximum braking force upon lapse of a predetermined time after receipt of said displacement detection signal.

* * * * *